US009440515B2

United States Patent
Knowles

(10) Patent No.: US 9,440,515 B2
(45) Date of Patent: Sep. 13, 2016

(54) AIR CONTAMINANT FILTRATION SYSTEM FOR A CABIN

(76) Inventor: Greg Brian Knowles, Ashby (AU)

(*) Notice: Subject to any disclaimer, the term of this patent is extended or adjusted under 35 U.S.C. 154(b) by 55 days.

(21) Appl. No.: 14/239,293

(22) PCT Filed: Aug. 9, 2012

(86) PCT No.: PCT/AU2012/000939
§ 371 (c)(1),
(2), (4) Date: Mar. 21, 2014

(87) PCT Pub. No.: WO2013/023240
PCT Pub. Date: Feb. 21, 2013

(65) Prior Publication Data
US 2014/0216257 A1    Aug. 7, 2014

(30) Foreign Application Priority Data
Aug. 18, 2011 (AU) ................. 2011903277

(51) Int. Cl.
*B60H 3/06* (2006.01)
*B01D 46/00* (2006.01)
*B60H 1/00* (2006.01)

(52) U.S. Cl.
CPC ............ *B60H 3/06* (2013.01); *B01D 46/0023* (2013.01); *B01D 46/0036* (2013.01); *B01D 46/0086* (2013.01); *B60H 1/00378* (2013.01); *B60H 1/00849* (2013.01); *B60H 3/0608* (2013.01); *Y10T 29/49716* (2015.01)

(58) Field of Classification Search
CPC .... B60H 3/0608; B60H 3/0625; B60H 3/06; B60H 1/00378; B60H 1/262; B01D 53/0446; B01D 53/944; B01D 46/42; B01D 45/08; B01D 46/0023

USPC .......... 55/385.3; 96/418, 421, 417; 454/139, 454/138; 422/120; 423/219
See application file for complete search history.

(56) References Cited

U.S. PATENT DOCUMENTS

| 3,657,992 A | * | 4/1972 | Minnick, Jr. ...... B60H 1/00378 454/136 |
| 4,531,453 A | * | 7/1985 | Warman ............... B60H 3/0608 454/139 |
| 5,256,103 A | * | 10/1993 | Abthoff ............... B60H 3/0625 454/139 |

(Continued)

FOREIGN PATENT DOCUMENTS

| DE | 9403123 U1 | 6/1994 |
| DE | 29504132 | 7/1996 |
| DE | 19646504 | 5/1998 |

OTHER PUBLICATIONS

Oct. 1, 2015 Supplementary Partial European Search Report.

*Primary Examiner* — Duane Smith
*Assistant Examiner* — Minh-Chau Pham
(74) *Attorney, Agent, or Firm* — Beck Tysver Evans, PLLC

(57) ABSTRACT

An air contaminant filtration system (10) for a cabin (12) includes an external air drawing system (14) for drawing air from an atmosphere surrounding the cabin (12). The system also includes an internal air extraction system (16) for drawing air from an atmosphere within the cabin (120, a main filtration system (18), and a filtered air delivery system (20). In the system, air drawn from the external drawing system (14) and from the internal air extraction system (16) is directed towards the main filtration system (18) for filtration and the filtered air is then directed towards the filtered air delivery system (20) for delivery to the cabin (12).

21 Claims, 4 Drawing Sheets

(56) References Cited

U.S. PATENT DOCUMENTS

| | | | | |
|---|---|---|---|---|
| 5,342,238 A * | 8/1994 | Segerpalm | ............ | B60H 1/262 |
| | | | | 454/136 |
| 5,735,338 A | 4/1998 | Chevroulet | | |
| 5,810,896 A * | 9/1998 | Clemens | ............ | B01D 46/0023 |
| | | | | 55/385.3 |
| 5,968,214 A * | 10/1999 | Nagata | ............... | B01D 53/0446 |
| | | | | 422/120 |
| 6,212,882 B1 * | 4/2001 | Greger | ................ | B01D 53/944 |
| | | | | 423/219 |
| 2005/0235833 A1 * | 10/2005 | Sassa | ................... | B60H 3/0608 |
| | | | | 96/417 |
| 2007/0144120 A1 * | 6/2007 | Kawasaki | ............ | B60H 3/0608 |
| | | | | 55/385.3 |
| 2013/0074459 A1 * | 3/2013 | Kuwada | ................. | B01D 46/42 |
| | | | | 55/385.3 |
| 2014/0345467 A1 * | 11/2014 | Viglione | .................. | B60H 3/06 |
| | | | | 96/421 |
| 2015/0027314 A1 * | 1/2015 | Kavounas | ............. | B01D 45/08 |
| | | | | 96/418 |

* cited by examiner

AIR CONTAMINANT FILTRATION SYSTEM FOR A CABIN

FIELD OF THE INVENTION

The invention relates to an air contaminant filtration system for a cabin. The invention is particularly suited for use in relation to heavy equipment vehicles, such as construction and mining equipment, that are exposed to asbestos fibres or other airborne contaminants as part of their ordinary operating environment.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Reticulating air conditioning/heating systems, such as those found on most mobile equipment, rely on a vacuum being created to draw air through the evaporator/heater cores. However, the creation of this vacuum inherently leads to the ingress of airborne contaminants, including dust.

To try and minimise this from occurring, such systems also employ extensive sealing structures. These sealing structures have proven to be difficult to adequately maintain.

Previous attempts to introduce filtration systems, such as High Efficiency Particle Air ("HEPA") filters, into such air conditioning system has also proven problematic. One key problem faced by such systems is that they work on the assumption that contaminants will not enter the vehicle cabin and thus only air drawn from the external environment need be filtered. This does not account for airborne contaminants which may enter the vehicle cabin by way of the ingress and egress of an operator or passenger. It also does not account for contaminants which may later become airborne after detaching from an operator or passenger's clothing.

It is therefore an object of the present invention to provide a system which overcomes, or at least ameliorates in part, the abovementioned problems.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is an air contaminant filtration system for a cabin comprising:
  an external air drawing system for drawing air from an atmosphere surrounding the cabin;
  an internal air extraction system for drawing air from an atmosphere within the cabin;
  a main filtration system; and
  a filtered air delivery system in the form of a prior installed air conditioning system for the cabin with its fan removed,
where, air drawn from the external drawing system and from the internal air extraction system is directed towards the main filtration system for filtration and the filtered air is then directed towards the filtered air delivery system for delivery to the cabin.

The external air drawing system should incorporate pressurising means for pressurising the air drawn from the atmosphere prior to delivery to the main filtration system. This pressurising means may take the form of a pressurisation fan or a pressurisation filter.

The external air drawing system may incorporate at least one filtration means for filtering air drawn from the atmosphere prior to delivery to the main filtration system.

The main filtration system may incorporate a plurality of filtration means for filtering air received from the external air drawing system or the internal air extraction system. The plurality of filtration means may be arranged in parallel. Alternatively, they may be arranged so as to provide multi-stage filtration of air received from the external air drawing system or the internal air extraction system.

The main filtration system may incorporates directing means to direct air drawn from the external air drawing system or the internal air extraction system towards a set of filtration means taken from the plurality of filtration means. The main filtration system may also include circulation fans to draw air from the external air drawing system and the internal air extraction system.

It is envisaged that the filtration means comprises at least one of the following types of filters: a high efficiency particle air filter; an active carbon filter.

At least the external air drawing system may be contained within a housing external to the cabin. The housing may then be attached to roof racks which are themselves attached to the cabin.

The housing may also include further components such as an external vehicle identification system and/or an external visual and/or audio safety system.

In accordance with a second aspect of the invention there is a method of filtering air contaminants for a cabin comprising the steps of:
  drawing air from an atmosphere surrounding the cabin;
  drawing air from an atmosphere within the cabin;
  filtering the drawn air from both atmospheres; and
  delivering the filtered air to the cabin by way of a prior installed air conditioning system for the cabin with its fan removed.

The method may also include the step of pressurising the air drawn from the atmosphere surrounding the cabin. The air drawn from the atmosphere surrounding the cabin may also be pre-filtered before the step of filtering the drawn air from both atmospheres.

The step of filtering the drawn air from both atmospheres may incorporate the substeps of filtering the drawn air from both atmospheres using a primary filtration means and then filtering the drawn air from both atmospheres using at least one secondary filtration means. It may also include the substep of directing air drawn from one or both atmospheres towards a particular filtration means.

In accordance with a third aspect of the invention there is a method of retrofitting a cabin to include an air filtration system for use with a filtered air delivery system in the form of an air conditioning unit already installed in the vehicle cabin, the method comprising the steps of:
  removing all fans from the air conditioning unit;
  installing the air filtration system to an external side of a roof of the vehicle cabin; and
  connecting the air filtration system to the air conditioning unit so that air filtered by the air filtration system can be delivered to the cabin by way of the air conditioning unit.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
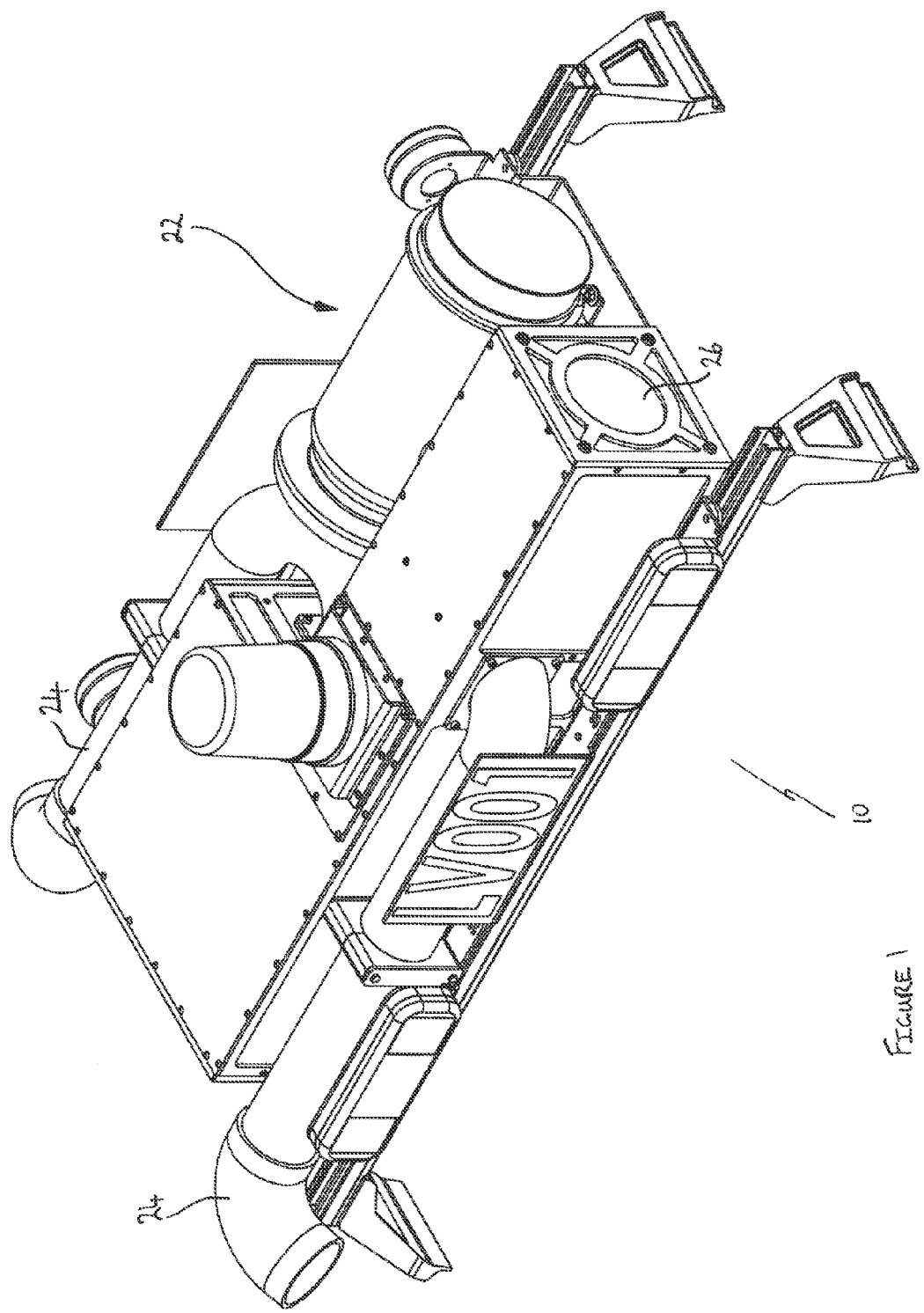
FIG. 1 is an isometric view of an air contaminant filtration system for a cabin according to the present invention.
Figure 2:
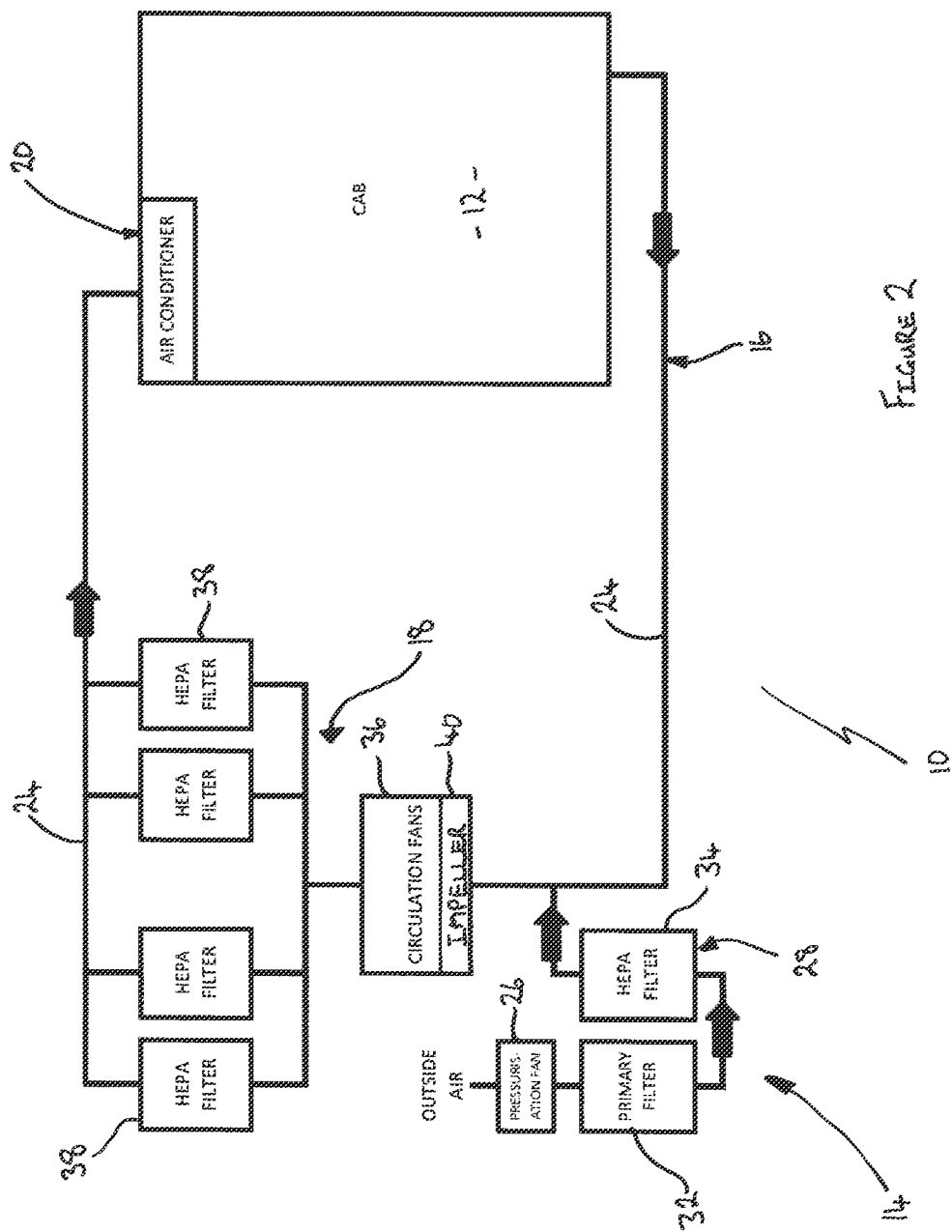
FIG. 2 is a schematic view of the air contaminant filtration system for a cabin as shown in FIG. 1.

In accordance with a first embodiment of the present invention there is an air contaminant filtration system 10 for a vehicle cabin 12 comprising:
- an external air filtration system 14;
- an internal air extraction system 16;
- a main filtration system 18; and
- an air conditioning system 20.

The external air filtration system 14, internal air extraction system 16 and main filtration system 18 are all contained primarily within a housing 22 external to the vehicle cabin 12. The various components of the external air filtration system 14, internal air extraction system 16 and main filtration system 18 are connected by a series of fluid conduits or ducts, hereafter referred to as ductwork 24.

The external air filtration system 14 comprises a pressurisation fan 26 and a plurality of filters 28. The pressurisation fan 26 is positioned within the housing 22 such that fan blades are configured so as to draw air into ductwork 24 from the outside atmosphere and direct it towards the plurality of filters 28.

The plurality of filters 28 comprises a primary filter 32 and a HEPA filter 34 arranged in sequence. The primary filter 32 operates to remove heavy and/or large airborne contaminant particles. The air filtered by the primary filter 32 is then directed to the HEPA filter 34. The HEPA filter 34 operates to remove sub-micron airborne contaminant particles.

Air filtered by the HEPA filter 34 is then directed to the main filtration system 18.

The internal air extraction system 16 comprises a portion of ductwork 24 leading from the vehicle cabin 12 to the main filtration system 18. The portion of ductwork 24 leading from the vehicle cabin 12 is open ended to allow both air and internal contaminants to be drawn through the ductwork 24 towards the main filtration system 18.

The main filtration system 18 comprises circulation fans 36 and a set of filters 38.

Circulation fans 36 operate to draw air from both the HEPA filter 34 and the vehicle cabin 12. To elaborate, in this embodiment, the circulation fans 36 take the form of two high powered 24-volt fans. Each fan 36 has a backwards facing impeller 40 to facilitate the drawing of air from the HEPA filter 34 and vehicle cabin 12.

Air passing through the circulation fans 36 is then pushed towards a set of filters 38. Each HEPA filter 38 in the set of filters 38 is arranged in parallel to each other. Hence, ductwork 24 leads separately from the circulation fans 36 to each HEPA filter 38.

Air that has passed through a HEPA filter 38 is then directed to a common portion of ductwork 24 and directed towards the air conditioning system 20.

Air conditioning system 20 comprises a slightly modified version of the standard air conditioning unit of the vehicle concerned. The modification relates to the air conditioning unit's fan, which is removed from the unit in its entirety.

This is important as it has been found by the applicants that if the air conditioning unit's fan is retained it actually operates against the remainder of the system 10 and thus decreases the efficiency of the system 10 as a whole.

Otherwise, the air conditioning system 20 operates to distribute the air received from the set of filters 38 about the vehicle cabin 12 according to the air conditioning unit's own venting system (not shown).

It should be noted that as the ductwork 24 comprises many parts the size, dimensions and shape of the various parts may vary as dictated by the role it plays in carrying air from one component to another. In some cases, such as the portion of the ductwork 24 leading to circulation fans 36, the ductwork 24 must be of sufficient size so as not to restrict the intake of the circulation fans 36.

Figure 3:
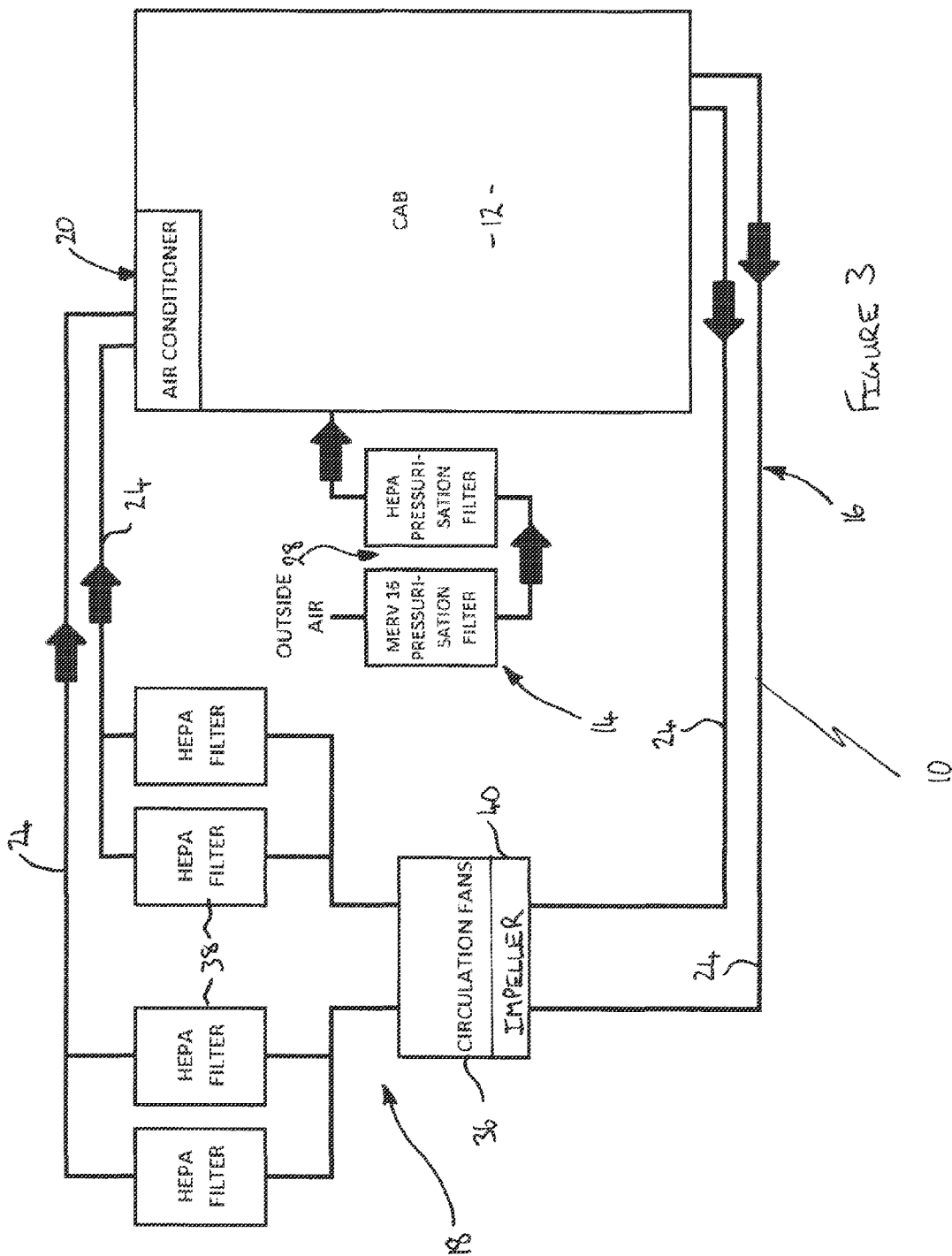
FIG. 3 is a schematic view of a variant air contaminant filtration system for a cabin.
Figure 4:
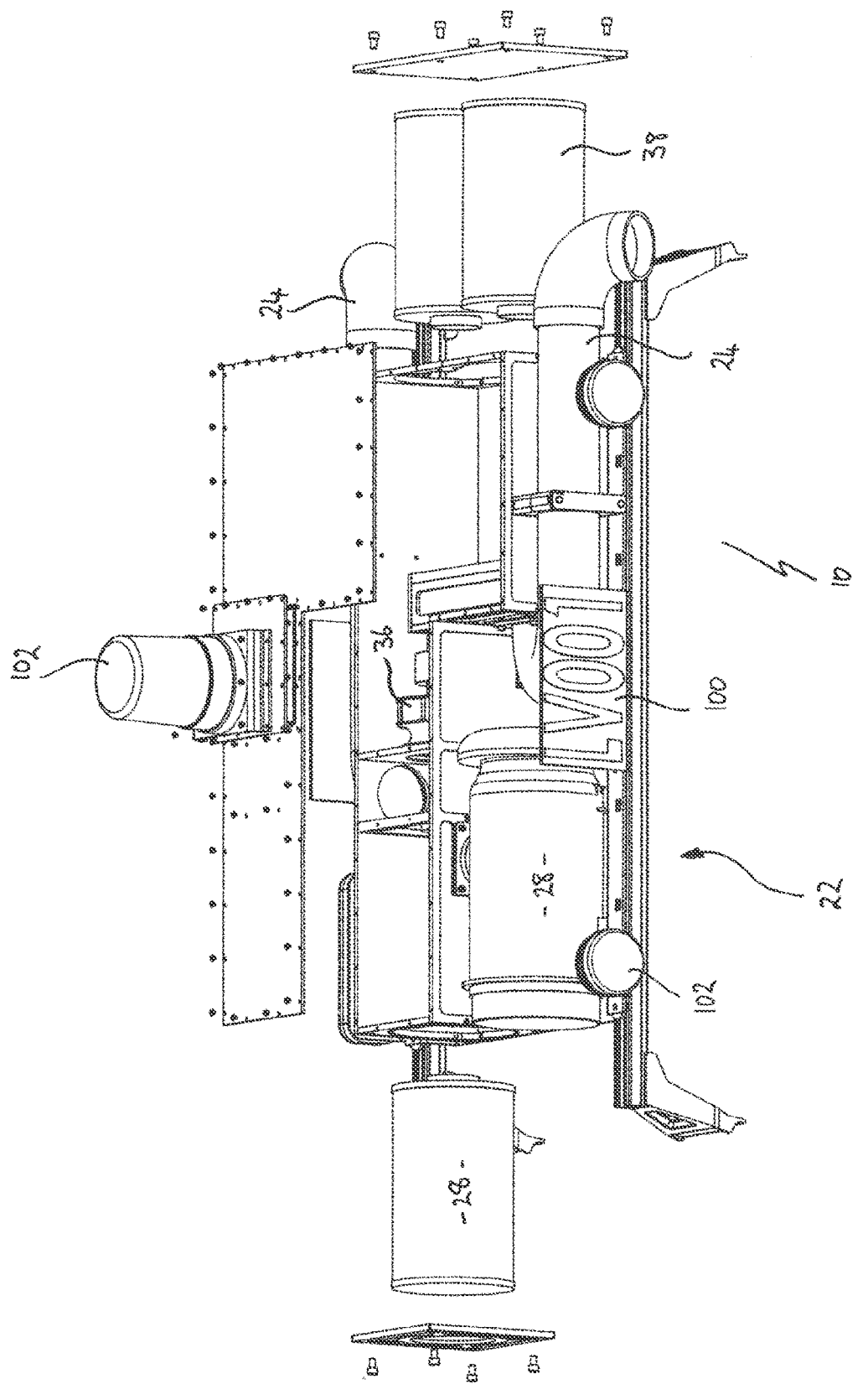
FIG. 4 is an isometric view of a variant air contaminant filtration system for a cabin as shown in FIG. 3.

It should also be appreciated by the person skilled in the art that the above invention is not limited to the embodiment described. In particular, the following modifications and improvements may be made without departing from the scope of the present invention:

- While the invention has been described as being suitable for use with a vehicle cabin 12, the invention is just as suitable for use with cabins for other forms of stationary equipment or for other forms of housing. Furthermore, the invention as described may be used with both heavy vehicle equipment and light vehicle equipment.
- While the invention has also been described in the context of fans for drawing in air to the various systems 14, 16, 18 and for moving air through the ductwork 24, other systems may be employed to facilitate such movement without departing from the scope of the present invention.
- Similarly, while the invention has been described primary in the context of the use of HEPA filters 34, 38, other filters may be used in place of, or in combination with, as HEPA filters 34, 38. For instance, active carbon filters and/or ultra low penetration air filters may also be used in the system 10 to facilitate removal of airborne contaminants. In a simpler version of the invention, where there is no concern for removal of contaminants at the sub-micron level and dust is the primary reason for implementation of the system 10, the HEPA filters 34, 38 may simply be replaced with coarse filters.
- While the system 10 is primarily focused on the removal of airborne contaminants in particulate form, the system 10 can also be adapted, by addition of the appropriate filters, to also facilitate removal of airborne contaminants in the form of chemicals, gases and/or odours.
- Depending on the size and requirements of air conditioning system 20, the number and size of the circulation fans 36 may be varied from that described above.
- Similarly, the flow requirement of the system 10 determines the number of HEPA filters 38 in the set of filters 38.
- The pressurisation fan 26 may be replaced with other pressurisation devices, such as a pressurisation filter. Where pressurisation filter(s) are used, as is shown in FIG. 3, the pressurisation filter(s) may also replace the primary filter 32 and HEPA filter 34.

Replacement of the pressurisation fan 26 with other forms of pressurisation devices may also necessitate the inclusion of a fan or similar device for drawing air through the pressurisation device. Alternatively, existing fan structures may be increased in power to achieve this aim.

The air conditioning system 20 may be replaced with any other form of filtered air delivery system for delivering air into the vehicle cabin 12.

The housing 22 may be mounted on roof racks to facilitate retrofitting on existing vehicle cabins 12. In the case of heavy vehicles, however, the system 10 may be adapted to be mounted on a mounting plate that is secured to the pickup points of the heavy vehicle.

The housing 22 may also incorporate an external vehicle identification system 100 such as that shown in FIG. 3.

The housing 22 may also incorporate an external visual and/or audio safety system 102 such as that also shown in FIG. 3.

The housing 22 may be designed so as to facilitate easy access to the various filters 32, 34, 38 for cleaning or replacement purposes.

The internal air extraction system 16 may itself include fans and or filters.

The number of circulation fans 36 may be varied from that described above according to system 10 requirements.

The set of filters 38 may incorporate filters of differing types. As a further development on this concept, the set of filters may be arranged in parallel, yet each parallel arrangement comprises a further set of filters arranged in series. In this manner, air may be directed through the same series of filters regardless of the parallel filter set the air is directed too.

The system may further include a direction means to direct air passing through the circulation fans towards a specific HEPA filter 38. This can be particularly useful when one or more of the HEPA filters 38 is underperforming or it is desirable to spread airflow evenly across the HEPA filters 38.

The external air filtration system 14 may omit the plurality of filters 28 in favour of filtration by means of the main filtration system 18 only.

It should be further appreciated by the person skilled in the art that the above variations and modifications, not being mutually exclusive, can be combined to form yet further embodiments that fall within the scope of the present invention.

What is claimed is:

1. An air contaminant filtration system for a cabin comprising:
    an external air drawing system for drawing air from an atmosphere surrounding the cabin;
    an internal air extraction system for drawing air from an atmosphere within the cabin;
    a main filtration system; and
    a filtered air delivery system in the form of a prior installed air conditioning system for the cabin with its fan removed,
    where, air drawn from the external drawing system and from the internal air extraction system is directed towards the main filtration system for filtration and the filtered air is then directed towards the filtered air delivery system for delivery to the cabin.

2. An air contaminant filtration system according to claim 1, where the external air drawing system incorporates pressurising means for pressurising the air drawn from the atmosphere prior to delivery to the main filtration system.

3. An air contaminant filtration system according to claim 2, where the pressurising means is a pressurisation fan.

4. An air contaminant filtration system according to claim 2, where the pressurising means is a pressurisation filter.

5. An air contaminant filtration system according to claim 1, where the external air drawing system incorporates at least one external air filter for filtering air drawn from the atmosphere prior to delivery to the main filtration system.

6. An air contaminant filtration system according to claim 1, where the main filtration system incorporates a plurality of main filters for filtering air received from the external air drawing system or the internal air extraction system.

7. An air contaminant filtration system according to claim 6, where the plurality of main filters are arranged in parallel.

8. An air contaminant filtration system according to claim 6, where the plurality of main filters are arranged so as to provide multi-stage filtration of air received from the external air drawing system or the internal air extraction system.

9. An air contaminant filtration system according to claim 6, where the main filtration system incorporates directing means to direct air drawn from the external air drawing system or the internal air extraction system towards a set of filters selected from the plurality of main filters.

10. An air contaminant filtration system according to claim 5, where the external air filter comprises at least one of: a high efficiency particle air filter; active carbon filter.

11. An air contaminant filtration system according to claim 1, where the main filtration system includes circulation fans to draw air from the external air drawing system and the internal air extraction system.

12. An air contaminant filtration system according to claim 1, where at least the external air drawing system is contained within a housing external to the cabin.

13. An air contaminant filtration system according to claim 12, where the housing is attached to roof racks and the roof racks are attached to the cabin.

14. An air contaminant filtration system according to claim 12, where the housing further incorporates an external vehicle identification system.

15. An air contaminant filtration system according to claim 12, where the housing further incorporates an external visual and/or audio safety system.

16. A method of filtering air contaminants for a cabin comprising the steps of:
    drawing air from an atmosphere surrounding the cabin;
    drawing air from an atmosphere within the cabin;
    filtering the drawn air from both atmospheres; and
    delivering the filtered air to the cabin by way of a prior installed air conditioning system for the cabin with its fan removed.

17. A method of filtering air contaminants for a cabin according to claim 16, where the method further includes the step of pressurising the air drawn from the atmosphere surrounding the cabin.

18. A method of filtering air contaminants for a cabin according to claim 16, where the method further includes the step of pre-filtering the air drawn from the atmosphere surrounding the cabin before the step of filtering the drawn air from both atmospheres.

19. A method of filtering air contaminants for a cabin according to claim 16, where the step of filtering the drawn air from both atmospheres comprises the substeps of filtering the drawn air from both atmospheres using a primary filter and then filtering the drawn air from both atmospheres using at least one secondary filter.

20. A method of filtering air contaminants for a cabin according to claim 16, where the method further includes the step of filtering the drawn air from both atmospheres includes the substep of directing air drawn from one or both atmospheres toward a particular filter.

21. A method of retrofitting a vehicle cabin to include an air filtration system for use with a filtered air delivery system in the form of an air conditioning unit already installed in the vehicle cabin, the method comprising the steps of:
- removing all fans from the air conditioning unit;
- installing the air filtration system to an external side of a roof of the vehicle cabin; and
- connecting the air filtration system to the air conditioning unit so that air filtered by the air filtration system can be delivered to the cabin by way of the air conditioning unit.

* * * * *